United States Patent [19]

Hasegawa et al.

[11] Patent Number: 5,673,249
[45] Date of Patent: Sep. 30, 1997

[54] PHASE CHANGE TYPE OPTICAL RECORDING APPARATUS AND OPTICAL RECORDING METHOD USING AN OVERWRITE SYSTEM

[75] Inventors: Hiroshi Hasegawa, Yokosuka; Hiromichi Kobori, Yokohama, both of Japan

[73] Assignee: Kabushiki Kaisha Toshiba, Kawasaki, Japan

[21] Appl. No.: 617,630

[22] Filed: Mar. 19, 1996

Related U.S. Application Data

[63] Continuation-in-part of Ser. No. 548,469, Oct. 26, 1995.

[30] Foreign Application Priority Data

Oct. 27, 1994 [JP] Japan .................................. 6-264085
Oct. 27, 1995 [JP] Japan .................................. 7-280778

[51] Int. Cl.$^6$ ............................................ G11B 7/00
[52] U.S. Cl. .................... 369/116; 369/54; 369/59
[58] Field of Search ................... 369/116, 54, 53, 369/100, 109, 110, 112, 47, 48, 13, 44.38, 59

[56] References Cited

U.S. PATENT DOCUMENTS 4,939,717  7/1990  Ohno et al. .
5,430,696  7/1995  Tokita et al. ................... 369/116 X
5,463,600  10/1995 Kirino et al. ....................... 369/13
5,485,449  1/1996  Nakajo ............................. 369/116

FOREIGN PATENT DOCUMENTS 0 265 971   5/1988   European Pat. Off. .
0 286 126   10/1988  European Pat. Off. .
5-32811     5/1993   Japan .

*Primary Examiner*—Muhammad N. Edun
*Attorney, Agent, or Firm*—Cushman, Darby & Cushman IP Group of Pillsbury Madison & Sutro LLP

[57] ABSTRACT

An optical recording apparatus which records information by irradiating an optical recording medium with a light beam of a first intensity P1 for an irradiation period $\tau 1$ so as to form an amorphous state area in the recording medium, with a light beam of a third intensity P3 during an irradiation period $\tau 3$ and with a light beam of a second intensity P2 so as to form a crystal state area in the recording medium optical recording medium includes an information recording area provided for recording the recording information and a recording condition recording area provided for recording a recording condition. The recording condition recording area is provided on one of an outer circumference side and inner circumference side of the information recording area. The recording condition recording area stores recording condition data representing the intensities P1, P2, P3 (P1>P2>P3) and irradiation periods $\tau 1$, $\tau 3$ of the light beam corresponding to the radius position of the optical recording medium and satisfying the condition $\{(P2-P3)\times\tau 3\}/\{(P1-P2)\times\tau 1\}=$ below unity.

13 Claims, 8 Drawing Sheets

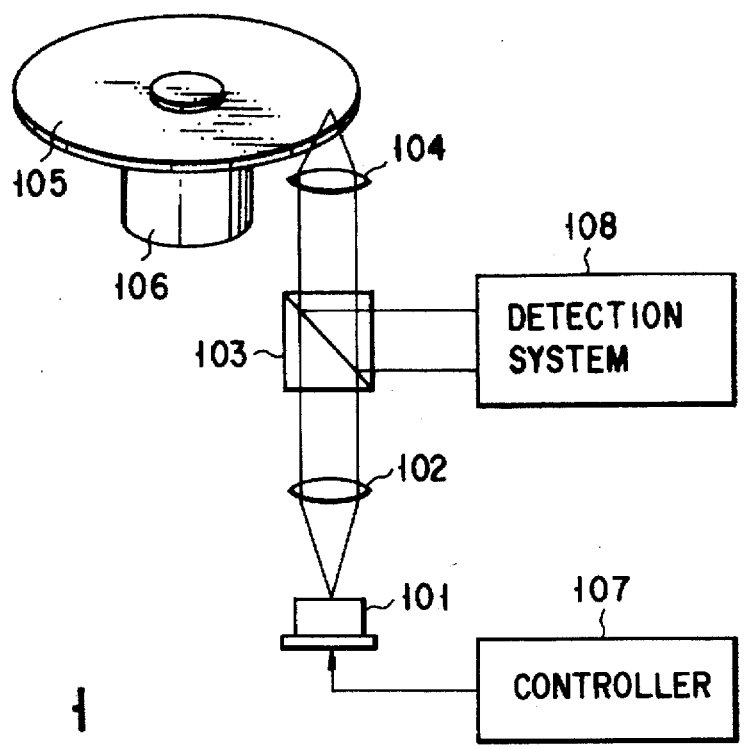
F I G. 1
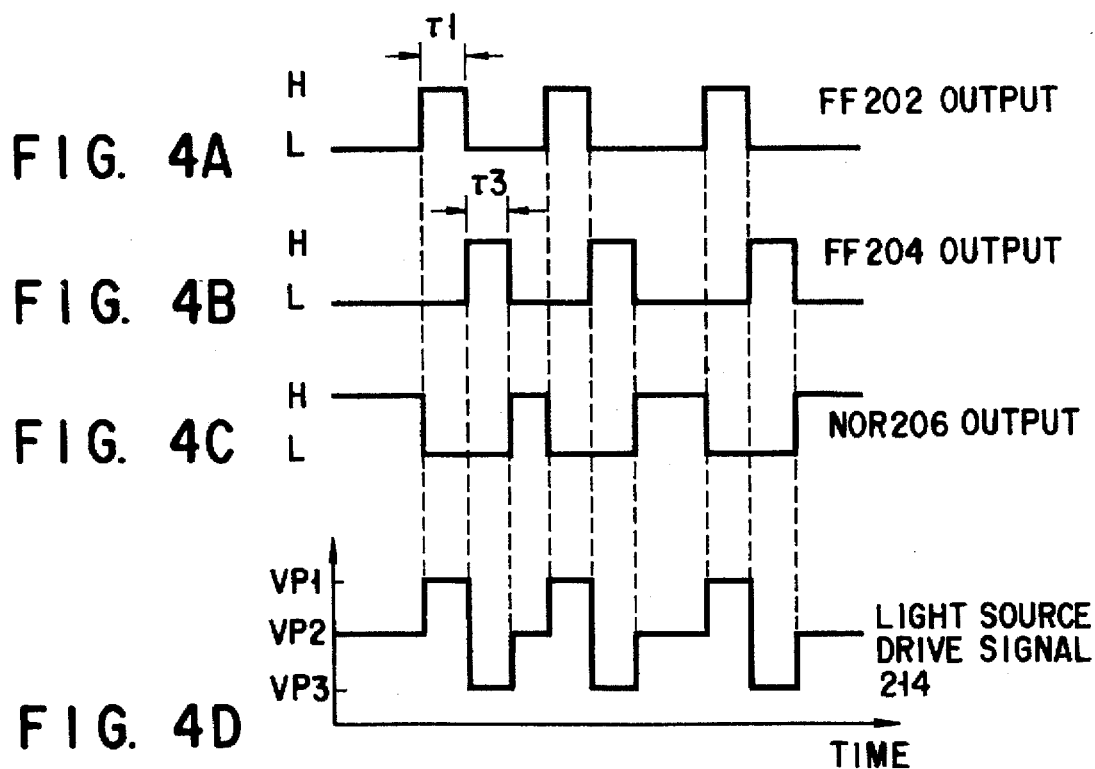
F I G. 4A
F I G. 4B
F I G. 4C
F I G. 4D

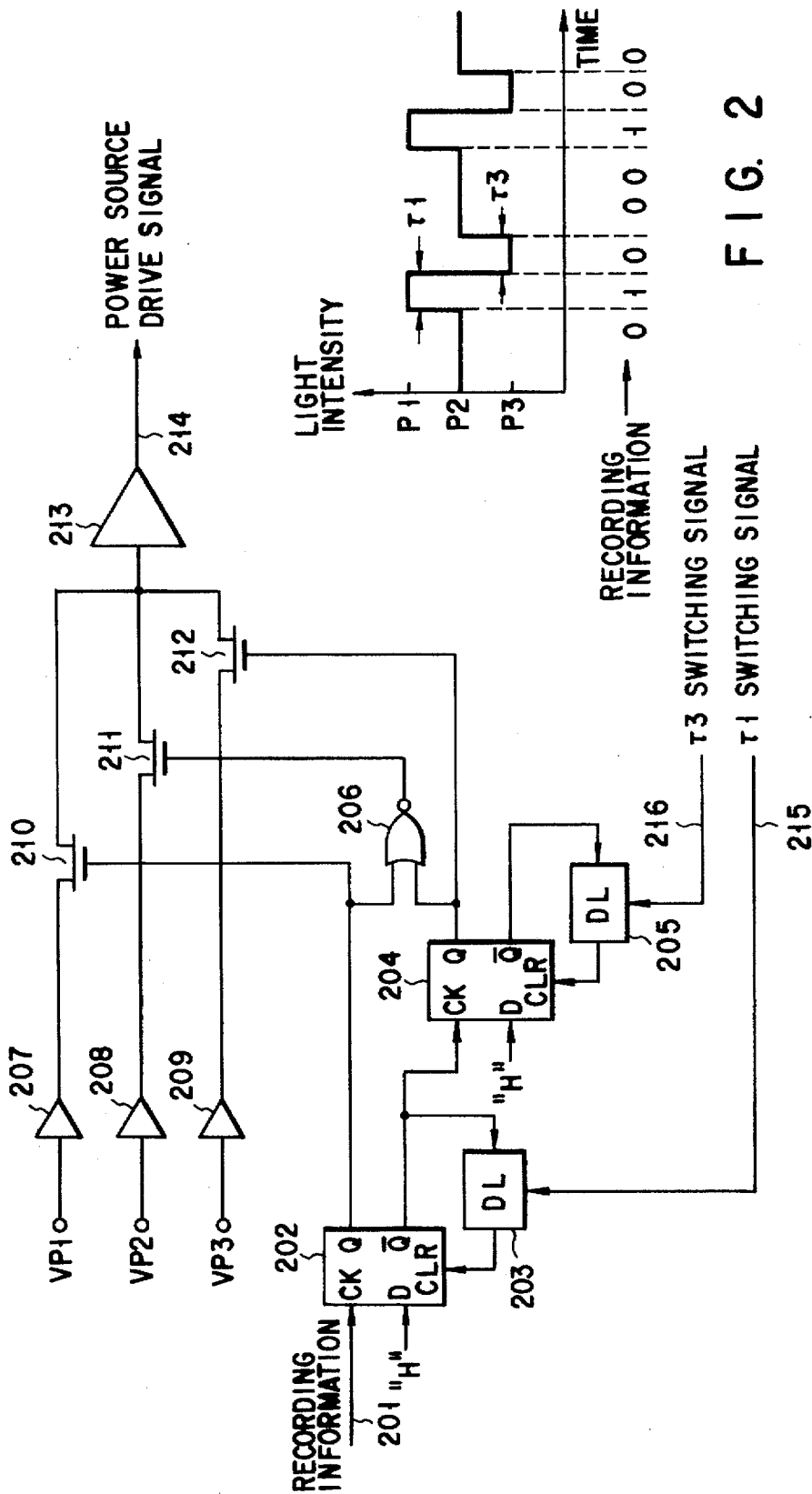

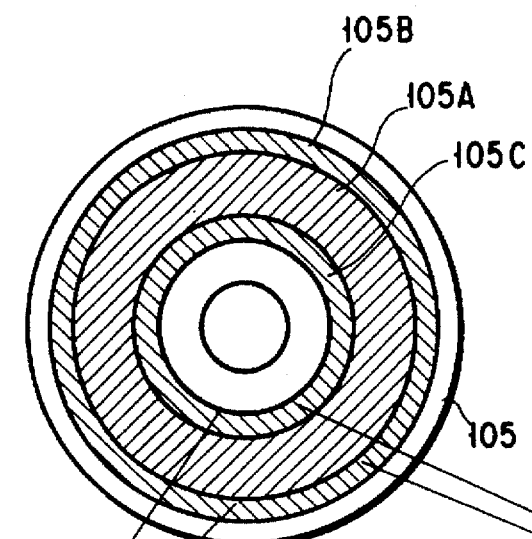
F I G. 9A
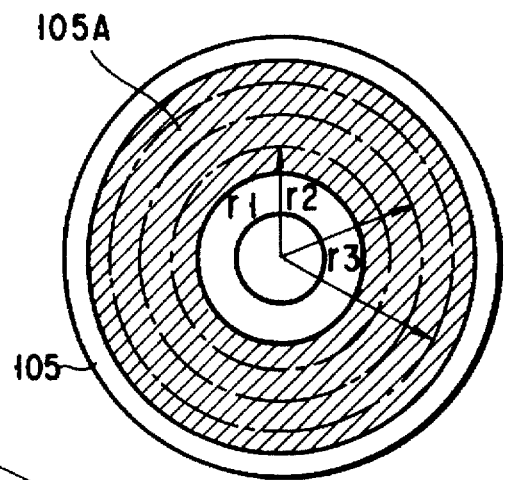
F I G. 9B
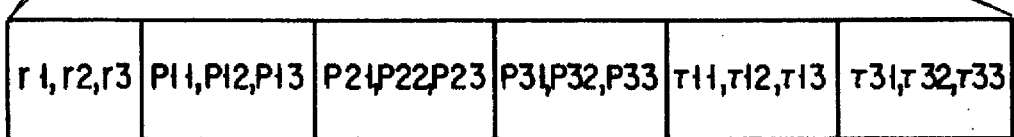
F I G. 9C
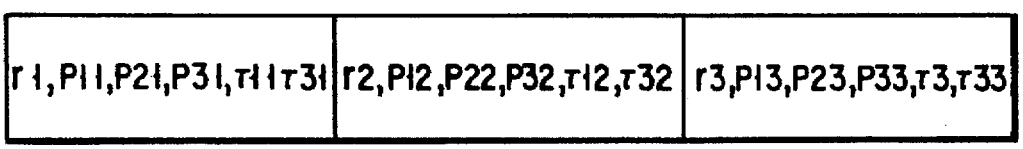
F I G. 9D
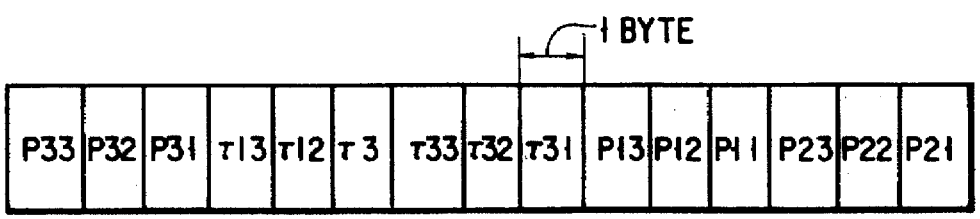
F I G. 9E

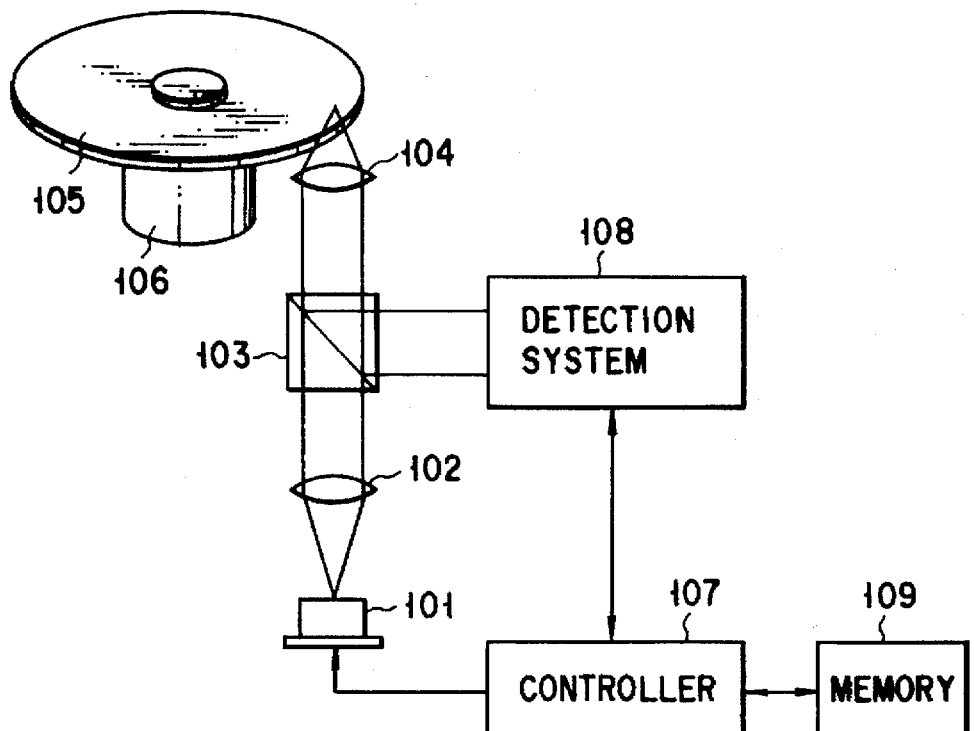
F I G. 12
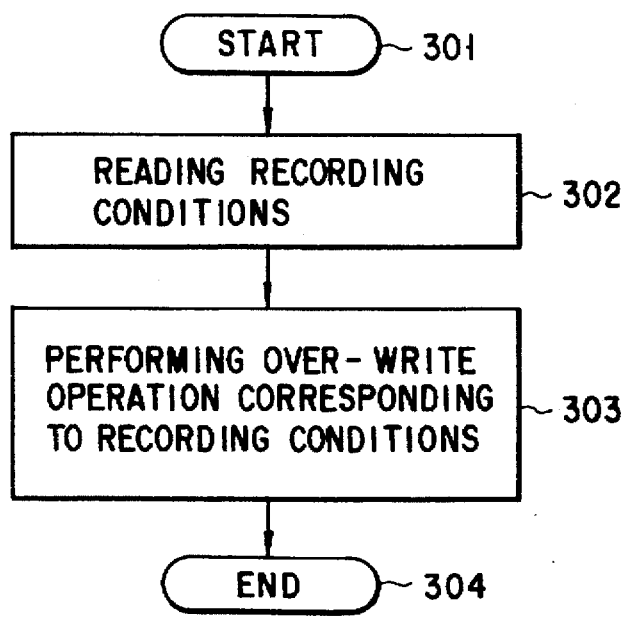
F I G. 13

PHASE CHANGE TYPE OPTICAL RECORDING APPARATUS AND OPTICAL RECORDING METHOD USING AN OVERWRITE SYSTEM

CROSS-REFERENCE TO THE RELATED APPLICATIONS

This application is a continuation-in-part of U.S. patent application Ser. No. 08/548,469, filed Oct. 26, 1995 pending.

BACKGROUND OF THE INVENTION

1. Field of the Invention

The present invention relates to a phase change type optical recording apparatus and optical recording method for recording information by creating crystal and amorphous states in a recording layer of an optical disk through the application of heat resulting from irradiation with a light beam.

2. Description of the Related Art

The so-called phase change type optical recording apparatuses have been researched and developed, as one form of a rewritable optical recording apparatus which record information through the utilization of a crystal/amorphous phase change of a recording material of which an optical recording medium is comprised. The phase change type optical recording apparatus and optical recording method using the so-called overwrite system record information by creating crystal/amorphous states in a recording layer of an optical disk through the application of heat resulting from irradiation with a light beam.

Stated in more detail, the phase change type optical recording apparatus controls the intensity of a light beam which is directed as a condensing beam onto an optical recording medium in accordance with the recording information and is basically of such a type so as to record the information on an optical recording medium at an amorphous area formation position with an irradiated light beam of a first intensity and at a crystal area formation position with an irradiated light beam of a second intensity lower than the first intensity which is used to record information at an amorphous area formation position on the optical recording medium.

In the phase change type optical recording apparatus of such a basic arrangement, a method has been proposed in U.S. Pat. No. 4,939,717 for obtaining a great reproduction signal by, during a given period following the completion of irradiation with a light beam of a first intensity, irradiating the medium with a light beam of a third intensity still lower than a second intensity, and allowing a melted area, which is formed with the irradiated light beam of the first intensity, to be rapidly cooled and, by doing so, enlarging the amorphous area.

In this known method, when the irradiation period of the light beam of the third intensity is too long, an area is created on the optical recording medium where it reaches no crystallization temperature. This makes the crystallization of an amorphous area of a previously recorded mark insufficient. That is, there occurs cases where new information is recorded on the medium at those recorded marks (amorphous areas) where they are not completely erased. This decreases recording reliability. Further, if the irradiation period of the light beam of the third intensity is too short, the recording mark becomes too large so that a reconstruction signal is lower in quality and no adequate recording reliability is obtained.

In the known method described above, only the irradiation period is specified for the light beam of the third period. Stated in more detail, according to U.S. Pat. No. 4,939,717, a relation $0<\tau<\lambda/V$ is prescribed, where $\tau$ represents the irradiation period of the light beam of the third intensity, $\lambda$ the wavelength of the light beam, and $V$ the relative speed between the light beam and the optical recording medium. From the research by the inventors, it has been found that, even if the irradiation period of the light beam of the third intensity is given as being equal, the excess or shortage of the irradiation period differs depending upon the intensity of the light beam of the third intensity. That is, irrespective of a recognition that the excess or shortage of the irradiation period of the light beam of the third intensity is determined by a relation between a temperature rise process ascribed to the light beam of the first intensity and its irradiation period and a temperature fall process ascribed to the light beam of the third intensity and its irradiation period, no suitable condition is considered, in the known patent above, about the relation. For this reason, it is impossible to obtain adequate recording reliability, because there arise incomplete erasure and a lowering in quality of a reproduction signal.

As set out, the known patent above simply specifies the irradiation period of the light beam of the third intensity and, because the irradiation period of the light beam of the third intensity becomes too long or too short, no adequate recording reliability is obtained by the known technique.

It is the object of the present invention to provide a phase change type optical recording apparatus and optical recording method which obtains adequate recording reliability by solving the incomplete erasure and lowering in quality of a reproduction signal problems resulting from the excess or shortage of an irradiation period of a light beam of a third intensity.

SUMMARY OF THE INVENTION

In order to achieve the above-mentioned task, an optical recording medium of the present invention records information by irradiating the optical recording medium with a light beam of a first intensity P1 during an irradiation period $\tau 1$, with a light beam of a third intensity P3 during an irradiation period $\tau 3$ and with a light beam of a second intensity P2 under a predetermined condition in which the optical recording medium comprises an information recording area provided for recording the information and a recording condition recording area provided for recording a recording condition on at least one of an outer circumference side and inner circumference side of the information recording area. The recording condition recording area stores recording condition data representing the intensities P1, P2, P3 (P1>P2>P3) and irradiation periods $\tau 1$, $\tau 3$ corresponding to the radius positions of the optical recording medium and satisfying the condition $\{(P2-P3)\times\tau 3\}/\{(P1-P2)\times\tau 1\}=$ below unity.

Further, another object of the present invention is achieved by an optical recording apparatus. That is, the optical recording apparatus records information by irradiating an optical recording medium with a light beam of a first intensity P1 during an irradiation period so as to form an amorphous state area in the medium, with a light beam of a third intensity P3 during an irradiation period $\tau 3$ and with a light beam of a second intensity P2 so as to form a crystal state area in the medium in which the optical recording medium comprises an information recording area provided for recording the information and a recording condition recording area provided on at least one of an outer circumference side and inner circumference side of the information recording area. The recording condition recording area stores recording condition data representing the intensities P1, P2, P3 (P1>P2>P3) and irradiation periods τ1, τ3 corresponding to the radius positions of the optical recording medium and satisfying the condition $\{(P2-P3)\times\tau3\}/\{(P1-P2)\times\tau1\}$=below unity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a schematic view showing an optical recording apparatus according to an embodiment of the present invention;

FIG. 2 shows a relation between recording information and the intensity of a light beam in the present embodiment;

FIG. 3 is a schematic view showing one practical form of a controller in the present embodiment;

FIGS. 4A to 4D are signal wavelength diagram for explaining an operation of the controller in FIG. 3;

FIGS. 9A to 9E are views showing a disk-like optical recording medium of the present invention;

FIG. 12 is a schematic arrangement of an optical recording apparatus according to another embodiment of the present invention; and FIG. 13 is a flow chart showing the operation of the optical recording apparatus as shown in FIG. 12.

DETAILED DESCRIPTION OF THE PREFERRED EMBODIMENTS

Figure 5A:
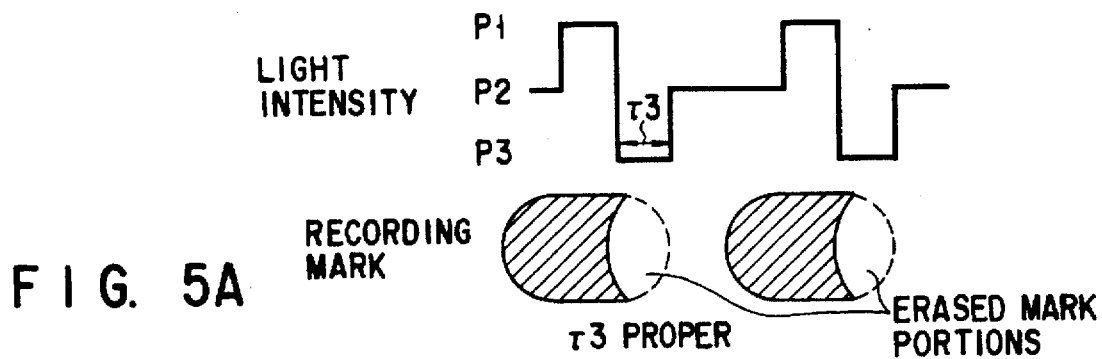
FIGS. 5A and 5B illustrate the relation between an irradiation interval of a light beam of a third intensity and a recording mark configuration in the present embodiment.

An embodiment of the present invention will be explained below with reference to the accompanying drawings.

FIG. 1 shows an arrangement of an optical recording apparatus according to one embodiment of the present invention. In FIG. 1, a light source 101 is comprised of, for example, a laser diode. A light beam emitted from a light source 101, after being transformed into a parallel beam by a collimator lens 102, is guided past a beam splitter 103 to an object lens 104 and, by the object lens 104, it is focused as a very small spot on a disk-like optical recording medium 105. The optical recording medium 105 is rotated at a predetermined speed by a motor 106. The light source 101 is adapted to have its beam illumination and intensity controlled by a signal supplied from a controller 107. In the case where information recorded on the optical recording medium 105 is to be reproduced, a reflected beam from the optical recording medium 105 is passed through the object lens 104 on a backward path in distinct from a path of an incident beam, separated by the beam splitter 103 from the incident beam and conducted to a detecting system, such as a light detector, where a reproduction information signal is picked up.

In the case where information is to be recorded on the optical recording medium, the intensity (light intensity) of the light beam is controlled by the controller 107 to a first intensity P1, a second intensity P2 and a third intensity P3 in accordance with recording information, as shown in FIG. 2. The first intensity P1 is used to form an amorphous state and the second intensity P2 to a crystal state and the third intensity P3 is lower in level than the second intensity P2. As will be seen from FIG. 2, in the case of the recording information being binary data ⌈0⌋ and ⌈1⌋, a light beam of the intensity P1 is directed only during a period τ1 to a position corresponding to ⌈1⌋ and, after a light beam of the intensity P3 is directed only during a period τ3, a light beam of the intensity P2 is kept directed till an interval corresponding to the next ⌈1⌋ position.

FIG. 3 is a practical circuit arrangement of the controller 107. FIG. 4 shows signal waveforms of respective parts of the circuit arrangement in FIG. 3. In FIG. 3, recording information 201 shows binary data entered in a reference clock cycle and is input to a clock input terminal CK of a first flip-flop 202 comprised of a D type flip-flop (DFF). An input terminal D of the flip-flop 202 is fixed to a "H" level. An inverting output of the flip-flop 202 is input to a clear terminal CLR of the flip-flop 202 via a delay line 203 with a delay amount τ1. In this way, a τ1-wide pulse is output from the flip-flop 202 in synchronization with a rise of data pulse of the recording information 201 as shown in FIG. 4A.

The output of the first flip-flop 202 is input to a clock input terminal CK of a second flip-flop 204 comprised of a D-FF. An input terminal D of the flip-flop 204 is fixed to a "H" level. An inverting output of the flip-flop 204 is input to a clear terminal CLR via a delay line 205 with a delay amount τ3. Thus a τ3-wide pulse is output from the flip-flop 204 in synchronization with a fall of the output pulse of the flip-flop 202 as shown in FIG. 4B.

Level setting values VP1, VP2 and VP3 are input to the controller 107 to set the light beam to the intensities P1, P2 and P3. The level setting values VP1, VP2 and VP3 are applied respectively through buffers 207, 208 and 209 to one-end of switches 210, 211 and 212. The other-end of switches 210, 211 and 212 are commonly connected to an input terminal of a drive amplifier 213. These switches are each comprised of a MOS transistor. A non-inverting output of the flip-flop 202 is connected to a control terminal of the switch 210, a NOR gate 206 is connected at its inputs to flip-flops 202 and 204 and at its output to a control terminal of the switch 211, and a non-inverting output of the flip-flop 204 is connected to a control terminal of the switch 212. FIG. 4C shows an output waveform of the NOR gate 206.

The drive amplifier 213 delivers a light source drive signal 214 for driving the light source 101 in FIG. 1. The light source drive signal 214 is modulated to the level setting values VP1, VP2 and VP3, as shown in FIG. 4D, by ON/OFF controlling the control terminals of the switches 210, 211 and 212 by those signals of FIGS. 4A, 4C and 4B.

The delay amounts τ1 and τ3 of the delay lines 203 and 205, that is, the irradiation periods of the light beams of the first and third intensities P1 and P3, are switched respectively by a τ1 switching signal 215 and τ3 switching signal 216 so as to set a proper condition on the recording medium 105 at respective recording radius positions (in radial positions of an information recording track). In a ZCAV (zone constant angular velocity) system, the surface of the optical recording medium 105 is divided in a radial direction into a plurality of zones and recording/reproduction is performed by varying a reference clock cycle at each zone, that is, by varying a recording frequency at each zone. In this case, the setting conditions can readily be obtained by putting at least one of τ1, τ3 in proportion to the reference clock cycle at each recording radial position. The simplest method is by having the τ1 and τ3 coincide with the reference clock cycle. It is to be noted that the ZCAV is also called an MCAV (modified constant angular velocity).

Further, instead of varying only one of the τ1 and τ3 in proportion to such a reference clock cycle it is possible to put at least one of (P2−P3)×τ3 and (P1−P2)×τ1 in proportion to the reference clock cycle where (P2−P3)×τ3: a total light amount by which a light amount reaching the medium with the irradiated light beam of the intensity P3 is lower than with the irradiated light beam of the intensity P2, and (P1−P2)×τ1: a total light amount by which a light amount reaching the medium with the irradiated light beam of the intensity P1 is higher than with the irradiated light beam of the intensity P2.

The circuit arrangement as shown in FIG. 3 can be changed in various practical forms and, for example, a monostable multivibrator may be used in place of the D type flip-flop (D-FF).

Now the information recording process of the present embodiment will be explained below with reference to FIGS. 5A and 5B.

Figure 5B:
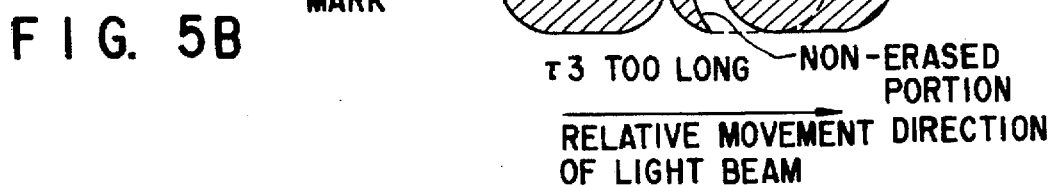

FIGS. 5A and 5B each show a relation of the intensities of the light beam and their irradiation times to recorded marks on the recording medium 105. When the light beam of the first intensity P1 is directed on the optical recording medium in a way to correspond to the recording information ⌈1⌋, a corresponding irradiated area is heated above a melting point and melted so that, after the completion of irradiation, the area becomes an amorphous state. By doing so, a recorded mark is formed at an amorphous area. When, on the other hand, the light beam of the second intensity P2 is directed on the optical recording medium 1 in a way to correspond to the recording information ⌈0⌋, a corresponding irradiated area is heated to a level less than a melting point but more than a crystal temperature so that it becomes crystalline.

When the light beam of the third intensity P3 is directed on the optical recording medium over a period τ3 subsequent to directing the light beam of the first intensity P1, the melted area formed with the irradiated light beam of the intensity P1 is rapidly cooled and, after the directing of the light beam of the intensity P3, the light beam of the second intensity P2 is directed on the recording medium over an interval corresponding to the recording information.

Here, in the case where irradiation period τ3 of the light beam of the intensity P3 is proper, an amorphous area formed with the irradiated light beam of the intensity P1 and rapidly cooled with the irradiated light beam of the intensity P3 has its latter half lost due to its crystallization starting on a part of the way through the irradiation of the light beam of the intensity P2 so that a length of a recorded mark is shortened in a relative direction of movement between the optical recording medium and the light beam. By doing so, even if an information recording density is enhanced by shortening an interval between those recorded marks formed as amorphous areas, it is possible to detect the recorded marks (amorphous areas) and non-recorded marks (crystallized areas) in a clearly distinguished way and hence to obtain a reproduction signal in excellent quality.

In a phase change type optical recording apparatus, areas that are broader than recording mark formation areas are melted on a recording medium upon recording of information and then cooled into an amorphous phase to form recorded marks. At that time, the outer edge of the melted area is crystallized upon cooling and, due to this effect, there hardly remains any previous history, that is, a trace (an irregularity among marks resulting from a difference in absorptivity between the amorphous area and the crystal area) of the recorded mark (amorphous area) so that better erasure can be obtained. That is a feature inherent in the phase change type optical recording apparatus.

As a result of strenuous investigations by the inventors, however, it has been found that when the relative speed of movement between the optical recording medium and the light beam upon information recording satisfies certain criteria, such as when the relative speed of movement between the medium surface and the light beam spot exceeds about 5 m/s, the above-mentioned effects are lessened because cooling takes place repeatedly at the outer edge of the melted area. As a result, there is more chance that the trace of the recorded mark will be left as an irregular mark and hence there will be poor erasure. In the case where recording/reproduction is performed on, for example, a 90 mm-diameter optical disk driven at 3,600 rpm, a relative speed of the light beam reaches as high as 15 m/s at an outermost circumference of the optical disk. Therefore, adequate consideration should be given to a possible poor erasure effect.

In a normal CAV system where the rotations speed of the optical disk is constant and a reference clock cycle is constant irrespective of a recording radial position, the greater the relative movement speed between the optical recording medium and the light beam, the greater the interval between those recorded marks. Therefore, even if there are some irregular marks resulting from poor erasure, any recorded mark can be detected in a way readily separable from an adjacent mark. For this reason, recorded information can be correctly reproduced, thus relatively readily securing the reliability of recorded information.

If, in order to increase a recording density, a ZCAV system by which the interval between recorded marks is made substantially equal at the inner and outer circumferences of a recording medium and made smaller than the spot size of a light beam (that is, the diameter of an area where the intensity of the light beam becomes more than the $e^{-2}$ times its center intensity) is used, an adverse influence becomes prominent due to poor erasure, in particular, at an outer circumference side where the relative movement speed between the optical recording medium and the light beam is great. That is, in those recorded marks of a smaller interval, the reliability of recording information becomes extremely poor due to irregularity among marks.

In the case where the relative movement speed of the light beam is over 5 m/s and the interval between the recorded marks is decreased below the spot size of the light beam, if the irradiation period τ of the light beam of the intensity P3 is provided, then it becomes particularly effective to enhance the erasability. By doing so, it is possible to adequately enhance the reliability of recorded information even in the ZCAV system for instance.

If τ3 becomes too long, as shown in FIG. 5B, then a space is created between a melted area irradiated with the light beam of the period P1 and the leading edge portion of a crystal area irradiated with the light beam of the intensity P2 so that the space area is not adequately crystallized. That is, even if part of the recorded mark is present in that space area, it cannot be erased by being fully crystallized and it is left there as a non-erased area, as shown in FIG. 5B, thus adversely affecting the reliability of the recording information. According to the present invention, this problem can be solved by properly setting the irradiation period τ3, without being too short or too long, and setting the respective intensities P1, P2 and P3 to proper levels. Now, a relation of an excess or shortage of τ3 to the medium temperature will be explained with the use of FIGS. 6A to 6D.

Figure 6A:
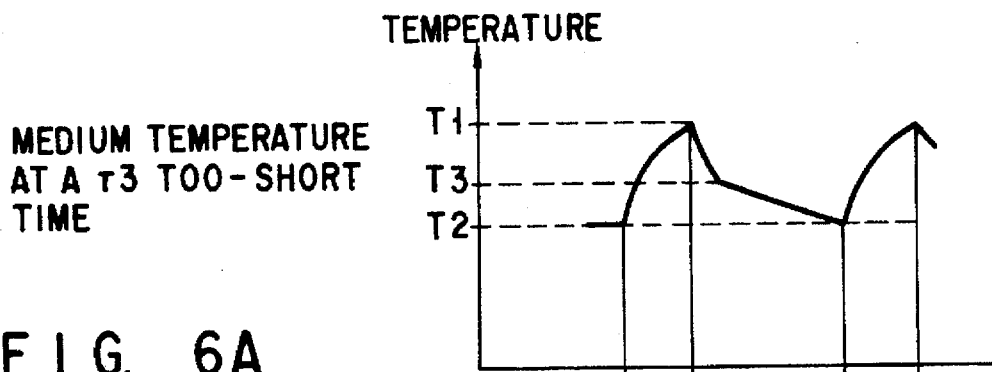
FIGS. 6A to 6D are views showing a relation of an irradiation period of a light beam of a third intensity and a medium temperature.

FIG. 6A shows the shift of a medium temperature when τ3 is short. In this case, cooling is slow from a heating temperature (melting temperature) T1 resulting from the irradiation of the medium with the light beam of the intensity P1 to a crystallizing temperature T2 resulting from the irradiation of the medium with the light beam of the intensity P2 so that a recorded mark forming an amorphous area becomes longer than necessary and it becomes difficult to distinguish a recorded mark and a non-recorded mark upon reproduction. This produces a lowering in quality of a reproduction signal, that is, in reliability of recording information.

Figure 6B:
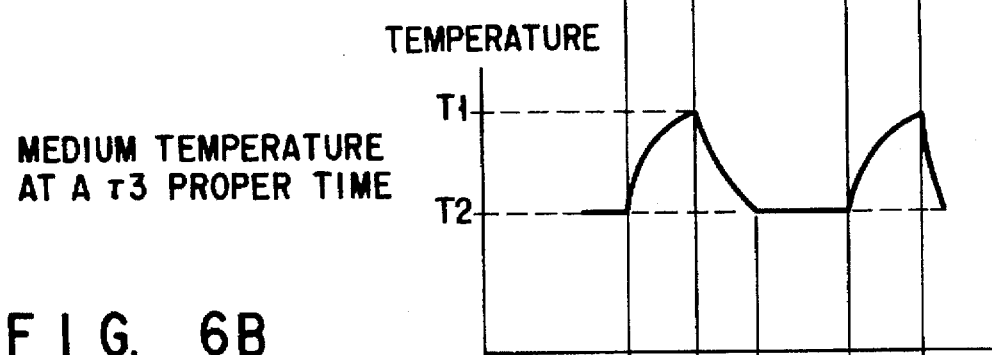

FIG. 6B shows a shift of the medium temperature when τ3 is a proper level. In this case, a shift of the medium from T1 to T2 is rapidly effected and it is possible to obtain a reproduction signal in excellent quality without the recorded mark being too long.

Figure 6C:
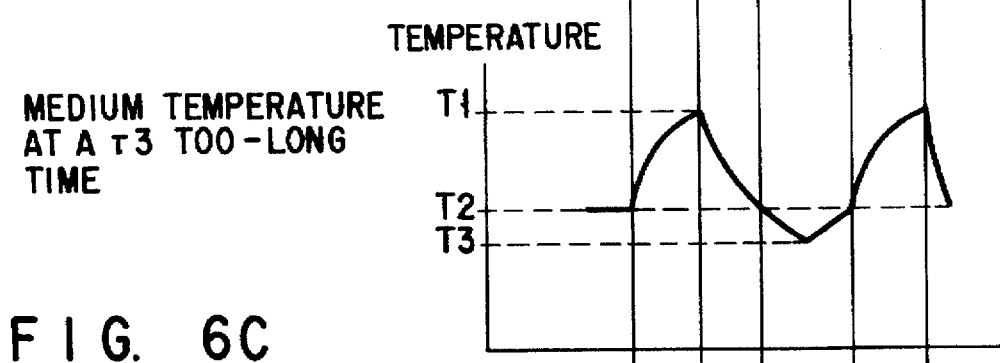

FIG. 6C shows a shift of the medium temperature when τ3 is too great. In this case, the medium temperature reaches a crystallization-short temperature T3 once on its way from T1 to T2. If, therefore, a recorded mark is formed on an area where the crystallization-short temperature T3 is reached, it cannot be erased by being crystallized. This lowers a reliability of the recording information.

The medium temperature T1 after the irradiation period τ1 of the light beam of the intensity P1 corresponds to a level to which a normal temperature T2 rises while reflecting an intensity increase (P1−P2) of the light beam due to the irradiation of the medium with the light beam of the intensity P2. With t representing the time constant of the temperature variation of the medium, this relation can be given by $$T1 = T2 + T2 \times (P1-P2)/P2 \times \{1 - \exp(-\tau 1/t)\} \quad (1)$$

On the other hand, the medium temperature T3 after the irradiation period τ3 of the light beam of the intensity P3 corresponds to a level to which, relative to a crystallization temperature (normal temperature) T2 resulting from the irradiation of the medium with the light beam of the intensity P2, a temperature falls from T1 while reflecting both an initial temperature difference (T1−T2) of the medium and a decrease amount (P2−P3) of light beam intensity. This relation can be given by $$T3 = T1 - \{(T1-T2) + T2(P2-P3)/P2\} \times \{1 - \exp(-\tau 3/t)\} \quad (2)$$

Assuming that, for example, τ1 and τ3 are adequately shorter than the time constant t, Equations (1) and (2) above can be simplified to $$T1 = T2 + T2 \times (P1-P2)/P2 \times \tau 1/t \quad (3)$$

$$T3 = T1 - \{(T1-T2) + T2 \times (P2-P3)/P2\} \times \tau 3/t \quad (4)$$

Finding a condition T3=T2 from Equations (3) and (4), $$(P2-P3) \times \tau 3 = (1-\tau 3/t) \times (P1-P2) \times \tau 1 \quad (5)$$

Here, since τ3 is assumed to be adequately smaller than t and the right-hand first side of Equation (5) is nearly equal to unity, the following equation is obtained.

$$(P2-P3) \times \tau 3 \approx (P1-P2) \times \tau 1 \quad (6)$$

Equation (6) above can be understood in the following way.

Figure 6D:
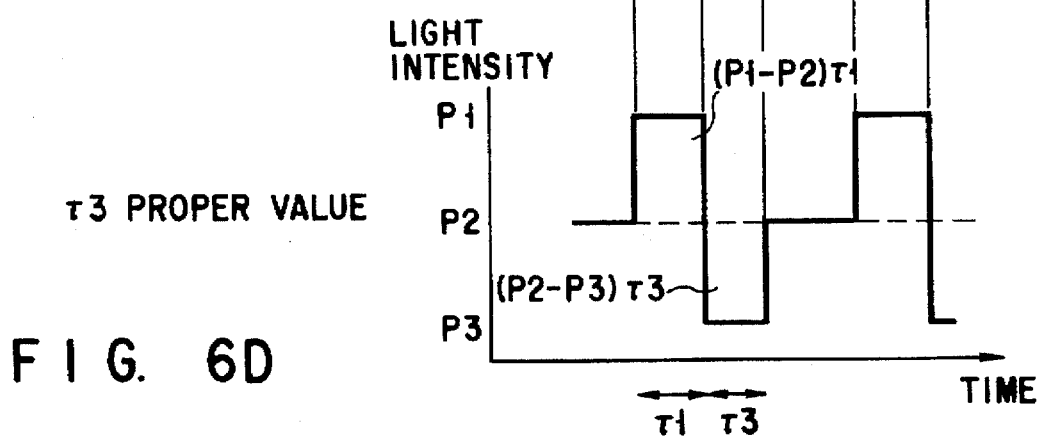

FIG. 6D shows a relation among the light beam intensities P1, P2 and P3 at τ3=a proper value and the light beam irradiation periods τ1 and τ3. As seen from FIG. 6D, (P2−P3)×τ3 on the left-hand side of Equation (6) shows a total light amount by which a light amount reaching the medium upon irradiation with the light beam of the intensity P3 is lower than upon irradiation with the light beam of the intensity P2. (P1−P2)×τ1 on the right-hand side of Equation (6) above shows a total light amount by which a light amount reaching the medium upon irradiation with the light beam of the intensity P1 is higher than upon irradiation with the light beam of the intensity P2. In the case where the irradiation times τ1 and τ3 are adequately shorter than the time constant t of the temperature variation, the cancellation of an influence resulting from the irradiation of the medium with the light beam of the intensity P1 and that resulting from the irradiation of the medium with the light beam of the intensity P3, setting these total light amounts equal to each other, that is, a total light amount ratio {(P2−P3)×τ3}/{(P1−P2)×τ1} to be unity, shows a condition under which the medium temperature immediately converges toward the crystallization temperature T2 after the irradiation of the medium with the light beam of the intensity P1 as shown in FIG. 6B.

In actual practice, the temperature change of the medium takes an exponential function as shown in FIGS. 6A, 6B and 6C and τ1 or τ3 is not always adequately shorter than t. Thus, the total light amount ratio in a proper recording state of FIG. 6B somewhat varies from unity but, normally, it is lower than unity as seen from Equation (5) where the right-hand first term is smaller than unity. That is to say, the proper recording condition is such that the total light amount ratio {(P2−P3)×τ3}/{(P1)−(P2)×τ1} is set below unity. In a "mark position recording", in particular, where τ1 or τ3 is usually both short and nearly equal, a relation of Equation (5) is maintained. From the experiments by the inventors it may be safely concluded that the proper recording condition is in a total light amount ratio range of nearly ⅓ to 1.

Figure 7:
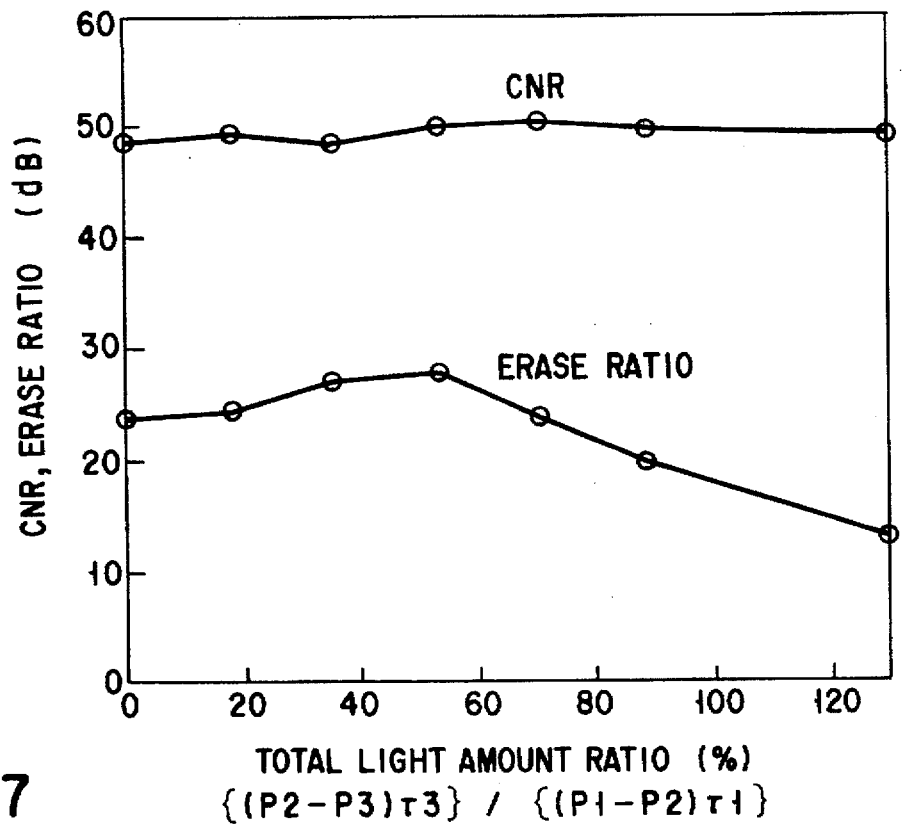
FIG. 7 is a graph showing a dependence of a total light amount ratio upon a CNR and erase ratio in the present embodiment.

FIG. 7 shows, as actually measured examples, a dependency of a CNR (carrier noise ratio) and erase ratio (dB) upon the total light amount ratio {(P2−P3)×τ3}/{(P1−P2)×τ1} when the irradiation time τ3 of the light beam of the intensity P3, as well as the intensity P2, varies. As an optical recording medium use is made of a phase change type disk having a structure with a protective layer, recording material layer, protective layer and reflective layer stacked on a resin substrate. The wavelength of the light source for recording/ reproduction is 690 nm; the linear speed (relative movement speed between the optical recording medium and the light beam), 9 m/s; the light beam intensity P1, 12 mW and P3, 1 mW; and the irradiation time τ1 of the light beam of the strength P1, 39 ns.

The CNR and erase ratio on the ordinate in the graph of FIG. 7, respectively, represent a signal recording performance and erase performance, the total light amount ratio {(P2–P3)×τ3}/{(P1–P2)×τ1} both desirable from practical viewpoint being in a range of below 1 (100%). That is, for the total light exceeding unity, CNR is better but the erase ratio largely falls. For the total light amount ratio being below 1, more preperably ⅓ to ⅔, the CNR and erase ratio both reveal practically satisfiable values. Further, according to the present invention, the total light amount ratio, being about ½ (50%), manifests a best performance both in the CNR and in the erase ratio.

In the present embodiment the total light amount ratio, being in a range of ⅓ to ⅔ in particular, is desirable, noting that this range varies depending upon the relative movement speed of the light beam and optical recording medium, the mark interval, the medium structure, etc. Various experiments have been conducted by the inventors, taking the above into condition. From this it has been found that the total light amount ratio, being in the range of nearly ⅓ to 1, reveals a suitable recording condition.

The dependence of a proper τ3 on P1 to P3 and τ1 will be explained below with reference to FIGS. 8A and 8D.

Figure 8A:
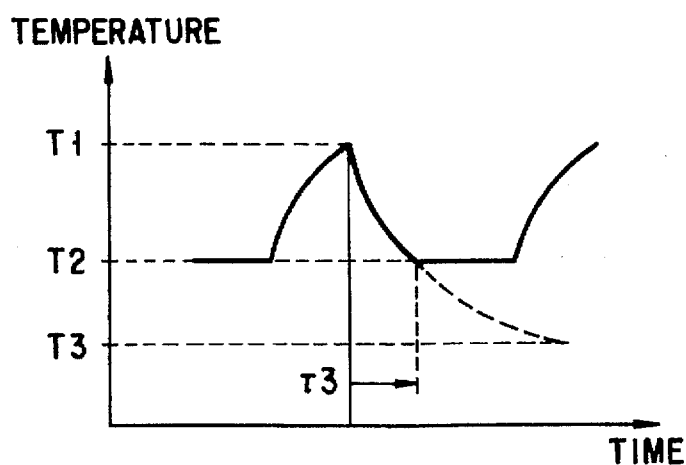
FIGS. 8A to 8D show a relation between respective light beam irradiation conditions and a proper τ3.

FIGS. 8A to 8D are views showing a transfer of an optical recording medium temperature as in FIG. 6. FIG. 8A represents P1, P2, P3, τ1 and τ3 as a reference. The recording medium is irradiated with a light beam of an intensity P1 during an irradiation period τ1 and, after the end of the irradiation above, with a light beam of an intensity P3. The temperature of the medium irradiated with the light beam of the intensity P3 falls from a peak level T1 down toward a target level T3. At this time, an interval to which the medium temperature reaches an erase level T2 becomes a proper τ3 value. This aspect corresponds to FIG. 6B.

Figure 8B:
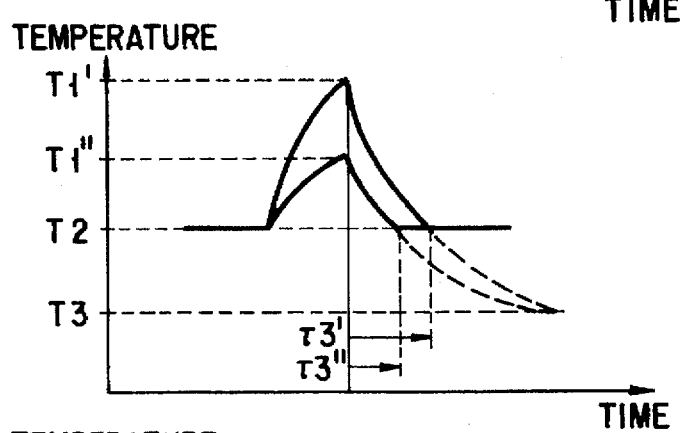

FIG. 8B shows a variation of the proper τ3 value in the case where the intensity P1 of the light beam varies from a reference level. The peak level T1' when the intensity P1 of the light beam becomes too large becomes higher than the peak level T1 at a reference time. The peak level T1" when the intensity P1 becomes too small becomes lower than T1. Thus, when, at the irradiation of the medium with the light beam of the intensity P3, the medium temperature falls toward the target level T3, a time reaching the level T2 differs between when the intensity P1 of the light beam becomes too large and when it becomes too small. That is, the proper τ3 becomes longer when P1 becomes too large and shorter when P1 becomes too small.

Figure 8C:
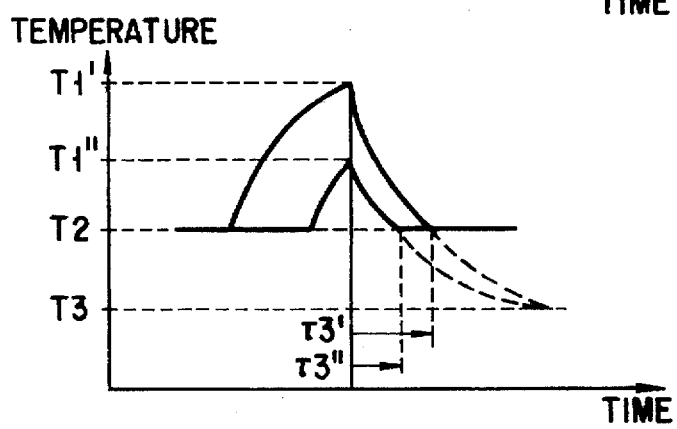

FIG. 8C shows a variation of the proper τ3 when τ1 alone varies from the reference level. As in the case where P1 varies, a peak level T1' at the time of τ1 becoming too large is higher than the peak T1 at the reference time and a peak level T1" at the time of τ1 becoming too small is lower than T1. Even in this case, the proper τ3' is longer when τ1 becomes too large and the proper τ3" is shorter when τ1 becomes too small.

Figure 8D:
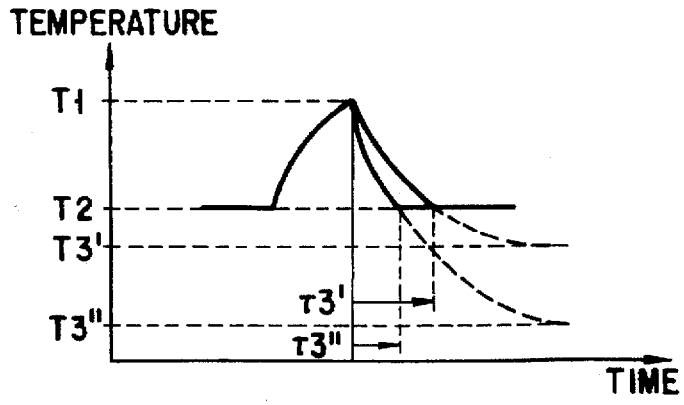

FIG. 8D shows a variation of the proper τ3 when P3 alone varies from the reference level. A target level T3 upon irradiation of the medium with the light beam of P3 varies depending upon the level of P3. A target temperature T3' when P3 becomes too large is higher than T3. Thus, when the temperature of the medium irradiated with the light beam of P3 falls from a peak level T1, the time to which the medium reaches the T2 level varies. The proper τ3 is longer when P3 becomes too large and shorter when P3 becomes too small.

As set out above, the proper τ3 varies depending upon P1, P2, P3 and τ1. In order to define the τ3 value, it is necessary to consider the above relation. Although, here, the variation of P2 is not set out, the proper τ3 value also varies since the variation of the medium temperature resulting from P1 and P3 is a phenomenon caused by (P1–P2) and (P2–P3).

One practical optical recording medium, as well as another embodiment different from the embodiment of FIG. 1, will be explained below with reference to FIGS. 9A to 9E to 13.

As shown in FIG. 9A, a disk-like optical recording medium 105 has an information recording area 105A. A first recording condition recording area 105B is formed at an outer circumference side of the information recording area 105A and a second recording condition recording area 105C is formed on an inner circumference side of the information recording area 105A. The first and second recording condition recording areas 105B and 105C records, therein, all of intensities P1 to P3 and delay amounts τ1 and τ3 or at least the delay amount τ3.

The recorded intensities P1 to P3 and delay amounts τ1 and τ3 are proper condition data for recording information in the information recording area 105A. If any information is to be recorded on a ZCAV system recording medium, the proper condition differs depending upon the radius position. Therefore, the condition data recorded at the first and second recording condition recording areas 105B and 105C are a plurality of data corresponding to those proper condition values of those radius positions (r1, r2, r3 in FIG. 9B) within the information recording area 105A as shown in FIG. 9B. The data correspondence relation is represented by a Table.

|  | radius position | P1 value | P2 value | P3 value | τ1 value | τ3 value |
| --- | --- | --- | --- | --- | --- | --- |
| data 1 | r1 | P11 | P21 | P31 | τ11 | τ31 |
| data 2 | r2 | P12 | P22 | P32 | τ12 | τ32 |
| data 3 | r3 | P13 | P23 | P33 | τ13 | τ33 |

Figure 10A:
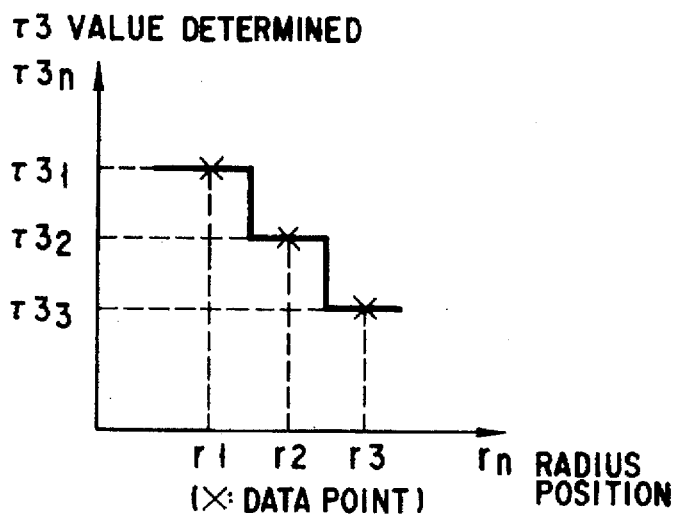
FIGS. 10A and 10B are characteristic curves showing a relation between the radius r of a disk-like optical recording medium and an irradiation time τ3 during which the optical recording medium is irradiated with a light beam of an intensity P3.
Figure 10B:
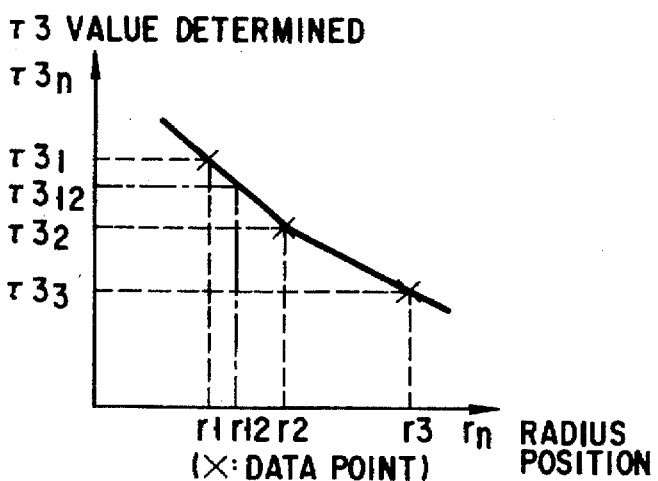
Figure 11:
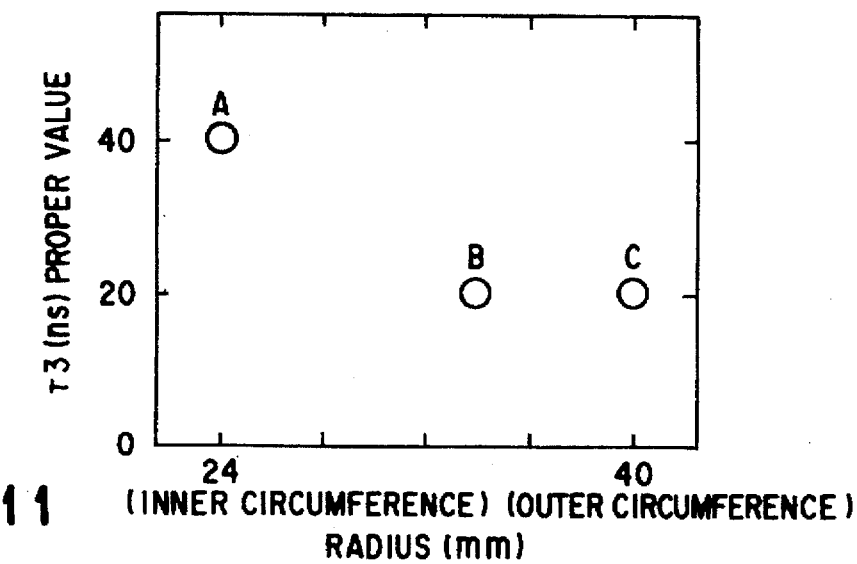
FIG. 11 is a characteristic curve showing a recording condition of the optical recording medium of the present invention.

The data above are recorded in the first and second recording condition areas 105B and 105C as shown in FIG. 9C. It is to be noted that, in FIG. 9C, the respective data are arranged in a per-item fashion, but that these data may be arranged, as shown in FIG. 9D, for each radius position. FIG. 11 shows a relation between the radius position and a τ3 proper value. The recording medium is of a 90 mm—diameter ZCAV system such that the linear velocity is 9 m/sec at an inner circumference (A point) position and is 15 m/sec at an outer circumference (C point) position. In the example shown in FIG. 9, the number of data recorded at the first and second recording condition recording areas 105B and 105C, including τ3, is given as three points corresponding to the radius positions (r1, r2, r3). If the data number is given by one point, then the τ3 value of all the recording areas is fixed to a single value, so that an excess or shortage occurs on the inner or the outer circumference side. In order to effectively solve this inconvenience, a plurality of data points are provided with a proper recording condition recorded on the medium at a plurality of radius positions and, upon the recording of the information, the recording condition of any given area is determined through the estimation from the data point. Known is, for example, a procedure (FIG. 10A) for dividing the area for each data point and performing a step-like determination or a procedure (FIG. 10B) for performing an interpolation between the data points by a line or a curve and determining that condition. That is, FIGS. 10A and 10B show the τ3 value determined at each of the radius positions r1, r2 and r3. In the case of FIG. 10A, the τ3 value varies, stepwise, in accordance with the radius position and, in the case of FIG. 10B, the τ3 value varies in a near-linear form, such as a straight line or a curve corresponding to the radius position.

In the case where two data points are provided as the data points, it it not possible to handle any complicated case where the conditions A to C, varying depending upon the recording radius as shown in FIG. 11, are not on a straight line. That is not adequate to determine the recording conditions of any areas. Needless to say, more data ensures higher accuracy of the determining conditions, but requires more recording condition recording area so that the information recording area becomes smaller. In addition thereto, the interpolation processing and period switching operation are complicated. In a practical case, the condition recording at the number of data points being about 3 or more is suitable.

The data to be recorded on the first and second recording condition recording areas 105B and 105C can be made a form as shown in FIG. 9E. FIG. 9E shows an example where, for the order of predetermined radius positions such as r3, r2, r1, the data such as P1 and τ1 are recorded in a way to be arranged for each data of P1, and τ1. In this case, the order of the predetermined radius positions is initially determined and, in that order, the data such as P1 and τ1 are entered so that it is not necessary to enter the radius position data for each data. This achieve a greater memory capacity, that is, a greater information recording area.

In the case above, the recording condition, such as τ3, may be applied to the case where it is recorded on the first recording condition recording area 105B only, where it is recorded on the second recording condition recording area 105C only and where it is recorded on both the first recording condition recording area 105B and the second recording condition recording area 105C. In the case shown in FIG. 9E, the recording condition is recorded preferably on both the first recording condition recording area 105B and the second recording condition recording area 105C. Needless to say, the intensities P1, P2, P3 (P1>P2>P3) and irradiation periods τ1, τ3 of the light beam satisfy the condition given below:

$$\{(P2-P3)\times\tau3\}/\{(P1-P2)\times\tau1\}=\text{below unity}.$$

Further, where the optical recording medium is rotated at a constant rate, the intensities P1, P2, P3 (P1>P2>P3) and irradiation periods τ1, τ3 of the light beam obeys the following condition. That is, in order to let $\{(P2-P3)\times\tau3\}/\{(P1-P2)\times\tau1\}$ to be below unity, at least one of $(P2-P3)\times\tau3$ and $(P1-P2)\times\tau1$ is varied in accordance with the recording radius $r_n$ over which the light beam of the disk-like optical recording medium 105 is irradiated.

FIG. 12 is a block diagram showing an optical recording apparatus according to another embodiment of the present invention. The operation of this apparatus is performed in accordance with a flow chart as shown in FIG. 13. When the operation of the optical recording apparatus is started at step 301 in FIG. 12, the disk-like optical recording medium 105 is rotationally driven. A detection system 108 detects recording condition data, such as τ3, recorded on the first and second recording condition recording area at least one of 105B and 105C of the disk-like optical recording medium 105. The recording condition data, such as τ3, thus detected is sent via controller 107 to a memory 109 where it is stored (steps. 301 and 302 in FIG. 13). A recording operation, if being done on a per-mark basis, is performed (step 303 in FIG. 13) in accordance with the recording condition data, such as τ3, stored in the memory 109. When the operation with the recording and determining the condition has been performed on all associated marks, the operation of the optical recording apparatus is completed (at step 304 in FIG. 13).

The optical recording apparatus of the present embodiment is defined as follows. That is, the optical recording apparatus records information on the recording medium by irradiating the recording medium with a light beam of a first intensity P1 during an irradiation period τ1 so as to form an amorphous state area at the recording medium and then with a third light beam of a third intensity P3 during an irradiation period τ3 and the recording medium with a second beam of a second intensity so as to form a crystal state area at the recording medium.

In this case, an information recording area for recording the information and a recording condition recording area are formed on the optical recording medium in which the recording condition recording area is formed on at least one of the outer circumference side and inner circumference side of the information recording area and stores, therein, the recording condition data representing the intensities P1, P2, P3 (P1>P2>P3) and their irradiation period τ1 and τ3 of the light beam satisfying $$\{(P2-P3)\times\tau3\}/\{(P1-P2)\times\tau1\}=\text{below 1}.$$

The recording condition recording area stores, therein, the recording condition data representing the intensities P1, P2 and P3, and at least τ3 of irradiation periods τ1 and τ3 of the light beam.

The optical recording apparatus of the present embodiment includes a recording condition data detecting means for detecting the recording condition data from the recording condition recording area prior to recording the information on the recording medium and a determining means for determining the intensities P1, P2, P3 at least τ3 of their irradiation periods τ1 and τ3 of the light beam in a plurality of radius positions on the information recording areas as used when the information is recorded on the recording medium on the basis of the recording condition data detected by the detecting means.

The determining means includes a means for setting a plurality of radius areas into which the information recording area is divided and a means for determining τ3 belonging to each radius area set by the setting means. For example, FIG. 10A shows the case where divided radius areas are provided for each data points of the recording condition data and the τ3 value on the data point in each area is set as an inherent τ3 to be constant in the area.

The determining means includes a means for setting a plurality of radius areas into which the information recording area is divided, a means for determining τ3 belonging to each radius area set by the setting means, and a means for calculating interporated τ3 obtained through the interpolation processing of the determined τ3 between the set radius areas. For example, FIG. 10B shows the case where divided radius areas are provided for each data points of the recording condition data and, with the τ3 value on the data points in each area set as an inherent r value, τ3 in each radius position is determined through an interpolation of the value τ3 between the areas.

As shown in FIG. 10B, for example, upon interpolation with a straight line it follows that, from both data points $r_n$, $r_{n+1}$ and their value τ3n, τ3n+1, τ3 in r is found as $$\tau 3 = \tau 3_n + (r - r_n) \frac{\tau 3_{n+1} - \tau 3_n}{r_{n+1} - r_n}.$$

To be specific, with $r_{12}$ between data points r1, r2, $$\tau 3_{12} = \tau 3_1 + (r_{12} - r_1) \frac{\tau 3_2 - \tau 3_1}{r_2 - r_1}.$$

Further, the optical recording method of the present embodiment can be defined as follows. That is, an optical recording method is provided for recording information on an optical recording medium by irradiating the recording medium with a light beam of a first intensity P1 during an irradiation period τ1 so as to form an amorphous state area at the recording medium and then with a light beam of a third intensity P3 during irradiation period τ3 and the recording medium with a light beam of a second intensity P2 so as to form a crystal state area at the recording medium, comprising the steps of:

detecting recording condition data from the recording condition data area prior to recording the information on the recording medium, the recording condition data being stored in a recording condition recording area formed on at least one of an outer circumference side and an inner circumference side of an information recording area of the recording medium and representing the intensities P1, P2, P3 (P1>P2>P3) and irradiation periods τ1 and τ3 of the light beam satisfying {(P2–P3)×τ3}/{(P1–P2)×τ1}=below 1; and recording the information on the recording medium on the basis of the recording condition data detected by the detecting step.

The information recording step comprises determining the intensities P1, P2, P3 and at least τ3 of the irradiation periods τ1 and τ3 of the light beam at a plurality of radius positions on the information recording area when the information is recorded on the recording medium on the basis of the recording condition data.

According to the present invention, as set out above, an amorphous area formation position on the optical recording medium is irradiated with the light beam of the first intensity P1 and then with the light beam of the third intensity P3 and a crystal formation area is irradiated with the light beam of the second intensity P2. When recording is made by doing so, the irradiation period τ3 of the light beam of the intensity P3 is made suitable. This solves poor erasure and a decline in quality of a reconstruction image and hence achieves improved recording.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical recording medium for recording information by irradiating the recording medium with a light beam of a first intensity P1 during a first irradiation period τ1, with a light beam of a third intensity P3 during a third irradiation period τ3 and with a light beam of a second intensity P2 under a predetermined condition, comprising:

an information recording area provided for recording the information; and a recording condition recording area, provided on at least one of an outer circumference side and an inner circumference side of the information recording area, for recording recording condition data, the recording condition data representing the intensities P1, P2, and P3, wherein P1>P2>P3, and irradiation periods τ1 and τ3 associated with radial positions of the optical recording medium and satisfying a condition {(P2–P3)×τ3}/{(P1–P2)×τ1}=below 1 for each radial position.

2. The optical recording medium according to claim 1, wherein the recording condition recording area stores a radius position data group representing a radius position r of the optical recording medium, a P1 recording condition data group, P2 recording condition data group, P3 recording condition data, τ1 recording condition data group and τ3 recording condition data group representing the intensities P1, P2, P3 and irradiation periods τ1, τ3 corresponding to the radial positions represented by the radial position data and satisfying the condition $${(P2-P3)×τ3}/{(P1-P2)×τ1}=\text{below unity}.$$

3. The recording condition recording area according to claim 1, wherein the recording condition recording area stores radius position data r and recording condition data P1, P2, P3, τ1 and τ3 associated therewith as a group for each radius position.

4. The optical recording medium according to claim 1, wherein the recording condition recording area stores, in accordance with a predetermined order of the radial positions of the optical recording medium, the recording condition data P1, P2, P3, τ1 and τ3 representing the intensities P1, P2, P3 (P1>P2>P3) and irradiation periods τ1, τ3 of the light beam and satisfying the condition $${(P2-P3)×τ3}/{(P1-P2)×τ1}=\text{below unity}.$$

5. The optical recording medium according to claim 1, wherein the recording condition recording area stores, at least τ3 of the intensities P1, P2, P3 and irradiation periods τ1, τ3 of the light beam for each of a plurality of radial positions of the information recording area.

6. An optical recording apparatus for recording information on an optical recording medium comprising:

an light beam irradiation unit for transmitting a light beam to the recording medium; and a control unit that controls the light beam so as to irradiate the optical recording medium with the light beam having a first intensity P1 during a first irradiation period τ1 so as to form an amorphous state area at the recording medium, the light beam having a third intensity P3 during a third irradiation period τ3 and the light beam having a second intensity P2 so as to form a crystal state area, wherein the optical recording medium comprises:

an information recording area provided for recording the information; and a recording condition recording area, provided on at least one of an outer circumference side and an inner circumference side of the information recording area, for recording recording condition data, the recording condition data representing the intensities P1, P2, and P3, wherein P1>P2>P3, and irradiation intervals τ1 and τ3 associated with radial positions of the optical recording medium and satisfying a condition {(P2–P3)×τ3}/{(P1–P2)×τ1}=below 1 for each radial position.

7. The optical recording apparatus according to claim 6, wherein the recording condition recording area stores a radius position data group representing a radius position r of the optical recording medium, a P1 recording condition data group, P2 recording condition data group, P3 recording condition group, τ1 recording condition data group and τ3 recording condition data group representing the intensities P1, P2, P3 and irradiation periods τ1, τ3 corresponding to the radial positions representing the radius position data and satisfying the condition $$\{(P2-P3)\times\tau3\}/\{(P1-P2)\times\tau1\}=\text{below unity.}$$

8. The optical recording apparatus according to claim 6, wherein the recording condition recording area stores radial position data r and the recording condition data P1, P2, P3, τ1 and τ3 associated with each radial portion of the recording medium as a group for each radial position.

9. The optical recording apparatus according to claim 6, wherein the recording condition recording area records, in accordance with a predetermined order of the radial positions, the recording condition data P1, P2, P3, τ1, τ3 representing the intensities P1, P2, P3 (P1>P2>P3) and irradiation periods τ1, τ3 and satisfying the condition $$\{(P2-P3)\times\tau3\}/\{(P1-P2)\times\tau1\}=\text{below unity.}$$

10. The optical recording apparatus according to claim 6, wherein the recording condition recording area stores recording condition data representing at least τ3 of the intensities P1, P2, P3 and irradiation periods τ1, τ3 for each of a plurality of radial positions of the information recording area.

11. The optical recording apparatus according to claim 6, further comprising recording condition data detecting means for, prior to recording the information into the recording medium, detecting the recording condition data from the recording condition recording area and determining means for, on the basis of the recording condition data detected by the recording condition data detecting means, determining at least τ3 of the intensities P1, P2, P3 and irradiation periods τ1, τ3 of the light beam for each of a plurality of radius positions of the information recording area.

12. The optical recording apparatus according to claim 11, the determining means comprises means for setting a plurality of radial areas into which the information recording area is divided, determining means for determining a specific τ3 for each of the plurality of radial areas set by the setting means.

13. The optical recording apparatus according to claim 11, wherein the determining means comprises:

setting means for setting a plurality of radial areas into which the information recording area is divided, determining means for determining a specific τ3 for each of the plurality of radial areas set by the setting means, and means for calculating an interpolated τ3 through an interpolation processing of the determined τ3 relative to the plurality of radial areas set by the setting means.

* * * * *